United States Patent
Jiang et al.

(10) Patent No.: US 8,587,722 B1
(45) Date of Patent: Nov. 19, 2013

(54) SYSTEM AND METHOD FOR AUTOMATICALLY CONTROLLING THE PHASE OF A CLOCK SIGNAL FOR SAMPLING AN HDTV SIGNAL

(75) Inventors: Jiande Jiang, San Jose, CA (US); Kenny Tseng, Pengyuan (TW); Walter C. Lin, Santa Clara, CA (US); Jung-Herng Chang, Saratoga, CA (US)

(73) Assignee: Entropic Communications, Inc., San Diego, CA (US)

( * ) Notice: Subject to any disclaimer, the term of this patent is extended or adjusted under 35 U.S.C. 154(b) by 2689 days.

(21) Appl. No.: 10/961,863

(22) Filed: Oct. 8, 2004

(51) Int. Cl.
*H03L 7/00* (2006.01)

(52) U.S. Cl.
USPC .......................... 348/537; 348/521; 348/525

(58) Field of Classification Search
USPC ......... 348/537, 521, 525, 542, 554–555, 558, 348/543
IPC .......................................................... H03L 7/00
See application file for complete search history.

(56) References Cited

U.S. PATENT DOCUMENTS

| | | | | |
|---|---|---|---|---|
| 5,192,915 A | * | 3/1993 | Mathieu et al. | 327/7 |
| 5,767,917 A | * | 6/1998 | Gornstein et al. | 348/543 |
| 6,329,850 B1 | * | 12/2001 | Mair et al. | 327/107 |
| 2005/0162552 A1 | * | 7/2005 | Xiu et al. | 348/521 |

* cited by examiner

*Primary Examiner* — Trang U Tran
(74) *Attorney, Agent, or Firm* — Bruce Greenhaus; Richard Bachand; Duane Morris LLP

(57) ABSTRACT

The present invention provides a system and method for automatically controlling the phase of the clock signal for sampling an HDTV signal, which implements a new and improved method for phase detection. The system and method utilize the standard format of an HDTV signal to consistently ensure accurate phase detection. Particularly, the system and method detect the target phase for the sampling clock using a tri-level sync pattern that exists at the beginning of each display line. This tri-level sync pattern or "sync pulse" is well suited for phase detection since it includes several static areas separated by substantial transitions. Furthermore, by using the sync pulse of the HDTV signal, the system and method provide consistent and accurate results, since the sync pulse will not change regardless of the whether the video data is static or in motion.

26 Claims, 4 Drawing Sheets

SYSTEM AND METHOD FOR AUTOMATICALLY CONTROLLING THE PHASE OF A CLOCK SIGNAL FOR SAMPLING AN HDTV SIGNAL

FIELD OF THE INVENTION

The present invention generally relates to digital display devices, and more particularly to a system and method for automatically controlling the phase of a clock signal for sampling a High Definition Television (HDTV) signal in a digital display device, which utilizes a new and improved method for phase detection.

BACKGROUND OF THE INVENTION

Digital display devices, such as liquid crystal display (LCD) monitors, typically receive analog signals from a video source (e.g., a personal computer) and convert the analog signals into a digital image. This conversion process involves various processing steps including an analog-to-digital conversion. The analog-to-digital conversion process is typically performed by a digitizer, such as an analog-to-digital (A/D) converter. The A/D converter receives a system clock signal that controls the operation of the converter. Particularly, the pulses of the clock signal are used to sample the rising and/or falling edges of the analog input signal. The conversion process requires the sampling frequency and phase of the clock signal to be precisely synchronized with the analog input signal. That is, to properly digitize the analog input signal, a line locked A/D converter clock signal, which is locked to the input signals at both frequency and phase, is required. Both the frequency lock and the phase lock are important to the conversion process. If the frequency is not properly locked to the input, some lower frequency components may be generated. If the phase is not correct, the A/D converter may sample the transition of the input analog signal, which causes serious noise at the digitized result. This will cause the display image to be degraded overall, include areas that are blurred, or be misaligned to the display area of the display monitor.

There are many methods to determine the phase for the sampling clock signal, such as spatial or temporal methods. Both spatial and temporal methods require the input signal to have several static areas with substantial transitions between the static areas. For a PC video input (e.g., PC_RGB), phase detection is relatively easy, since most PC content is static graphics with substantial transitions. But for a High Density Television (HDTV) input (e.g., HD_YPbPr), phase detection is more difficult, since most of the video content is motion picture graphics, which are not as sharp as PC graphics.

Therefore, it would be desirable to provide a system and method for automatically controlling the phase of a clock signal for sampling an HDTV signal that uses a new and improved method for phase detection.

SUMMARY OF THE INVENTION

The present invention provides a system and method for automatically controlling the phase of the clock signal for sampling an HDTV signal, which implement a new and improved method for phase detection. The system and method utilize the standard format of an HDTV signal to consistently ensure accurate phase detection. Particularly, the system and method detect the target phase for the sampling clock by use of a tri-level sync pattern that exists at the beginning of each display line. This tri-level sync pattern or "sync pulse" is well suited for phase detection since it includes several static areas separated by substantial transitions. Furthermore, by using the sync pulse of the HDTV signal, the system and method provide consistent and accurate results, since the sync pulse will not change regardless of the whether the video data is static or in motion.

According to one aspect of the present invention, a method for detecting a phase of a clock signal for sampling an HDTV signal is provided. The method includes detecting a sync pulse of the HDTV signal; and selecting a phase for the clock signal using the sync pulse.

According to another aspect of the present invention, a system for detecting a phase of a clock signal for sampling an HDTV signal is provided. The system includes a circuit that detects a sync pulse of the HDTV signal, and selects a phase for the clock signal using the sync pulse.

According to another aspect of the present invention, a display device is provided. The display device includes a display monitor for displaying images provided by an HDTV video source; and an A/D converter that is communicatively coupled to the display monitor, and that uses a clock signal to convert an analog input signal from the HDTV video source into a first digital signal that is used by the display monitor to display images. A phase-locked loop is communicatively coupled to the A/D converter and provides the clock signal to the A/D converter. A phase detection circuit receives the first digital signal and determines a target phase for the clock signal using a sync pulse portion of the first digital signal. A controller is communicatively coupled to the phase detection circuit and to the phase-locked loop. The controller is adapted to instruct the phase-locked loop to provide the clock signal at the target phase based on information received from the circuit.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
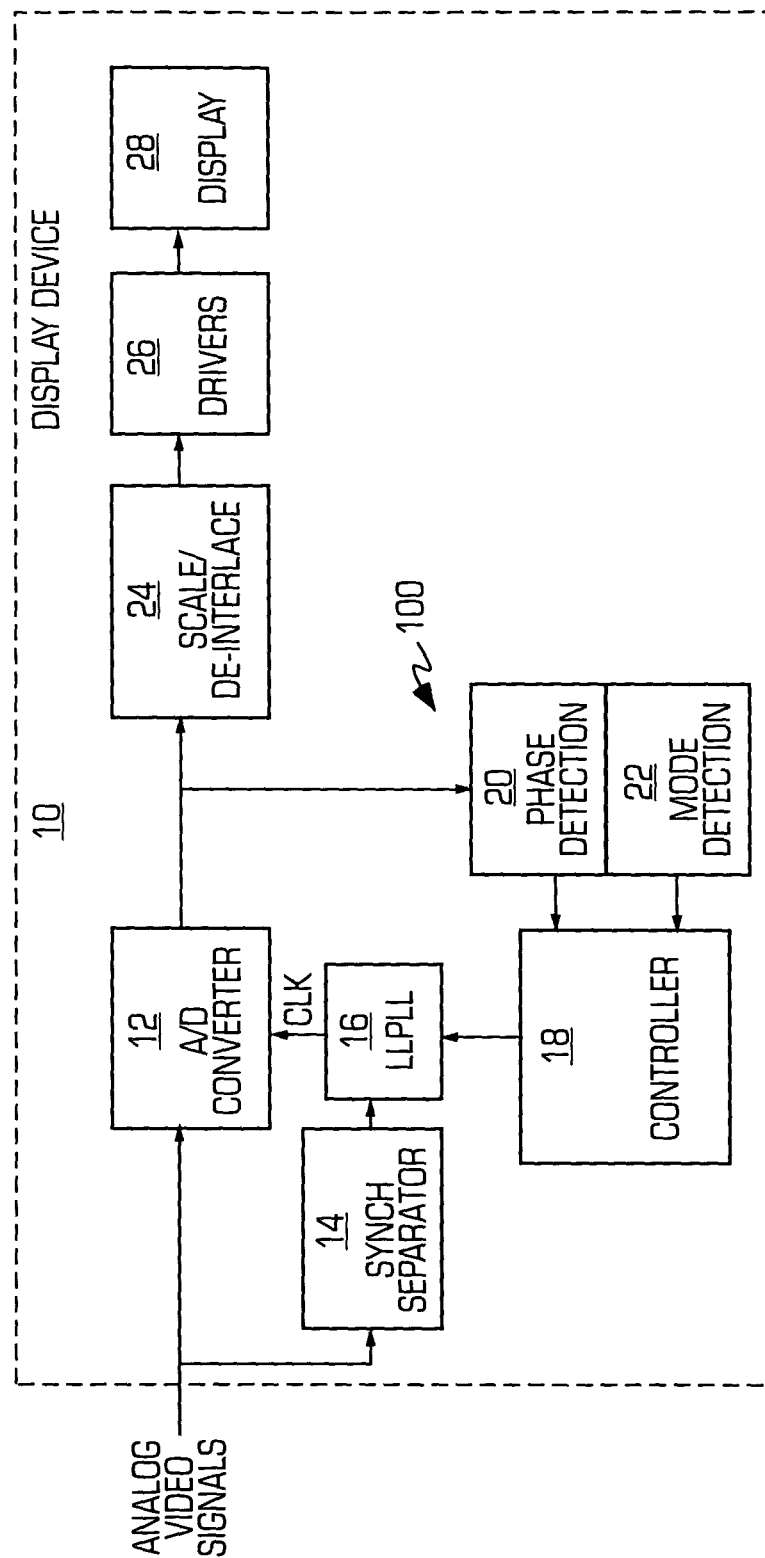
FIG. 1 illustrates a block diagram of a display device including a system for automatically controlling phase of a clock signal for sampling an HDTV signal, in accordance with the present invention.

FIG. 1 illustrates a block diagram of a digital display device 10 including a system 100 for automatically controlling the phase of a clock signal for sampling an HDTV signal, according to one embodiment of the present invention. For purposes of clarity, only those components of the display 10 and system 100 that are relevant to the present invention are illustrated and discussed. Furthermore, while the present invention will be primarily described in relation to a system 100, it should be appreciated that each of the portions or blocks illustrated in FIG. 1 may represent logic steps or processes performed according to an inventive method. Conventional hardware, software and/or firmware may be used to perform the logic steps and/or processes.

System 100 includes a target analog to digital (A/D) converter 12, a sync separator 14, a line-locked phase-locked loop (LLPLL) 16, a controller 18, and a clock phase detection circuit 20. System 100 may also include mode detection circuit 22. System 100 may form a portion of a receiver of the digital display device 10 for converting analog video signals into digital samples. The display device 10 may be a conventional display device (e.g., an LCD or plasma monitor). The display device 10 may include conventional processing components, such as scaling and de-interlacing circuits 24, display drivers 26 and a display screen or monitor 28. Circuits 24 may be conventional circuits adapted to scale the resolution of the received image data to the resolution of the display monitor 28, and to convert interlaced image frames into to progressive frames for display on display monitor 28. Drivers 26 may include conventional driving circuits, which drive the electronics in display monitor 28, thereby causing the display monitor 28 to display the digital image. The display device 10 may further include a conventional frame buffer and a display controller for providing the samples from the buffer to the drivers 26 and monitor 28. Analog video signals are provided to the display device 10 by one or more video sources (not shown). These signals may include conventional RGB signals from a PC video source (PC_RGB), including red (R), green (G) and blue (B) component signals, and YPbPr signals from an HDTV video source (HD_YPbPr), including Y, Pb and Pr color encoded signals.

A/D converter 12 is communicatively coupled to LLPLL 16, phase detection block 20 and scaling and de-interlacing circuits 24. A/D converter 12 may be a conventional A/D converter, which is adapted to convert the analog input signals into digital image signals, which are communicated to processing circuits 24 and to the phase detection circuit 20 and mode detection circuit 22. The A/D converter 12 provides the digital image signals by sampling each of the component signals in accordance with the clock signal. For sampling each component of the RGB and YPbPr signals, the A/D converter may include three channels. Alternately, the A/D converter 12 may comprise three single-channel converters.

Sync separator circuit 14 receives PC_RGB and YPbPr video signals and is communicatively coupled to LLPLL 16. Sync separator circuit 14 is adapted to separate synchronizing components from the picture-representative components of the video signals, and communicate the synchronizing components/data to the LLPLL 16. LLPLL 16 uses the sync components along with information from controller 18 to provide a clock signal CLK to A/D converter 16.

Controller 18 is communicatively coupled to LLPLL 16, phase detection circuit 20 and mode detection circuit 22. In one embodiment, controller 18 is a conventional microcontroller including a microprocessor and tuning circuitry. The tuning circuitry and processor operate together to control the frequency and phase of the clock signal CLK provided by LLPLL 16. Particularly, the controller 18 receives information from the phase detection circuit 20 and mode detection circuit 22 and, based on this information, instructs LLPLL 16 to provide a clock signal CLK that produces an improved image displayed by monitor 28.

Phase detection circuit 20 is coupled to and receives the sampled digital signals from A/D converter 12. As discussed more fully and completely below, phase detection circuit 20 selects an appropriate phase for sampling the analog signal and communicates the signal to controller 18, which instructs LLPLL 16 to adopt the selected phase.

Mode detection circuit 22 is also coupled to controller 18 and is adapted to detect a mode or spatial resolution of the video signals PC_RGB and HD_YPbPr. For PC_RGB signals, this may include detecting the relative frequencies and polarities of the sync components of the signal. For HD_YPbPr signals, this may include detecting the sync pattern or "sync pulse" (discussed below) of the HDTV signal, which is unique to the mode of the HD signal (e.g., 1080i and 720p each have a unique sync pulse that may be used to define the start of each line). The resulting data is provided to the controller 18, which uses the data to control the frequency of the clock signal CLK generated by LLPLL 16.

The following discussion describes the operation of the system and method for controlling the phase of the sampling clock signal, according to the present invention.

In operation, the system 100 automatically and continuously controls the phase of the sampling clock signal to correspond to the phase of the analog input signal to ensure that sampling is occurring in an appropriate manner. Because variances may occur due to changes in temperature, source timing, cable variances, power variances, environmental factors and the like, it is important to detect and maintain a proper phase of the sampling clock. The system 100 uses a unique method for determining the phase of the clock signal for sampling HDTV signals, which relies on a unique characteristic of the standard HDTV format.

The A/D converter 12 receives analog input signals from a video source (e.g., a computer or HDTV source) and samples all three channels (e.g., R, G, B channels or Y, Pb, Pr channels) according to the clock signal CLK received from the LLPLL 16. The resulting output is a multi-channel (e.g., three-channel) digital input signal, which is communicated to the scaling and de-interlacing circuits 24. In one embodiment, the digital samples formed by the A/D converter 12 are 8-bit samples, thus, providing 256 discrete sample values, although another number of bits may be selected for the samples. The circuits 24 process the signal and provide the processed output to drivers 26, which drive the pixels of the display screen 28, thereby producing an image.

The resulting digital output from A/D converter 18 is also provided to phase detection circuit 20, which controls the alignment of the phase of the clock signal CLK to the analog input signal. The manner in which phase detection circuit performs this alignment depends on whether the signal is an RGB signal or an HDTV (i.e., a YPbPr) signal.

RGB Signals

For RGB signals, the phase detection circuit 20 may operate in a conventional manner. For example, in one embodiment, the circuit 20 and controller 18 may monitor the alignment by searching for sampled values over the entire signal that represent a sharp border or transition between a light and dark area in the display image. In these "transition areas", samples of the analog signal that are proximate in time have significantly different values.

Figure 2:
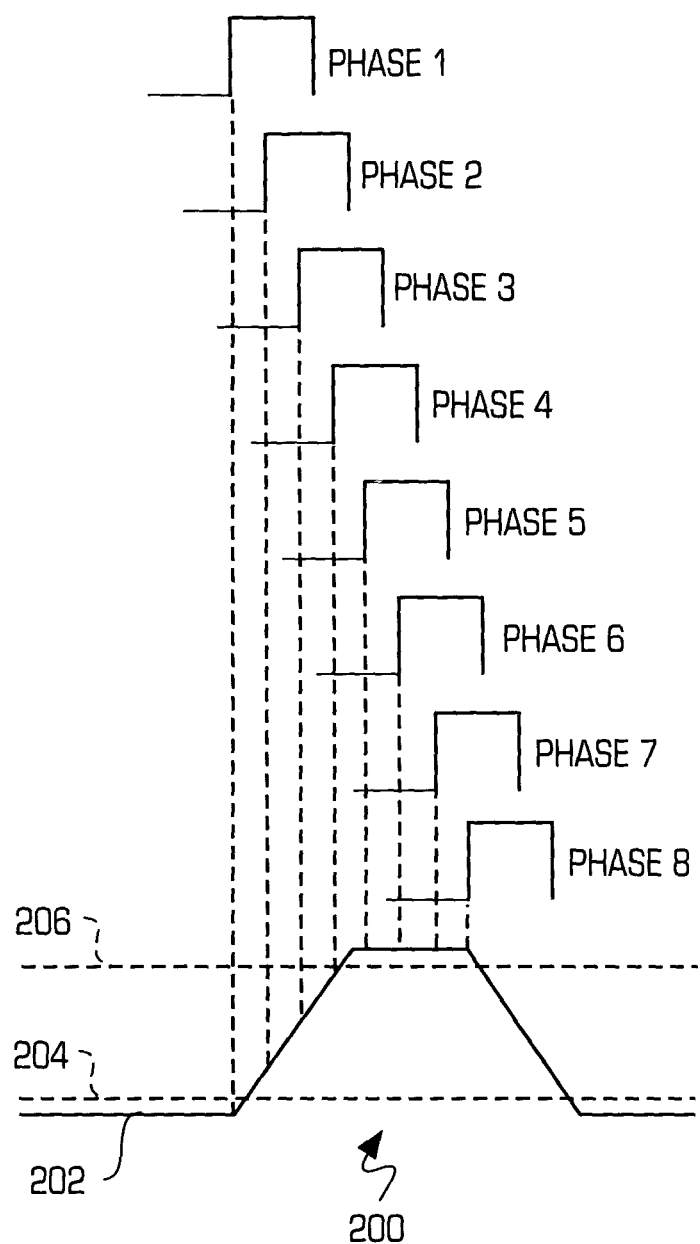
FIG. 2 illustrates a block diagram of an example of a timing diagram for adjusting the phase of a sampling clock signal.

For example, FIG. 2 illustrates a transition 200 in an analog video signal 202 that would appear in a display image as a transition between a dark and light area. The phase detection circuit is adapted to identify such a transition, and in response, it signals LLPLL 16 to adjust the phase of the clock signal CLK to each of a plurality of phases (e.g., phases 1-8). Although FIG. 2 illustrates a simplified example with only 8 phases, any number of phases may be sampled according to the invention. Upon a leading edge of the clock signal for each of the plurality of phases a sample is taken of the waveform 202, as shown in FIG. 2 by the vertical dotted lines that intersect the waveform 202.

Whether a phase of the clock signal is appropriate may be determined by comparing the corresponding samples to various threshold levels 204, 206. More particularly, assuming that a phase results in sampling the waveform 202 below the level 204, then this indicates that the lower level is being sampled (e.g., phase 1). Assuming that a phase results in sampling the waveform 202 above the level 206, then this indicates that the phase results in sampling at the higher level (e.g., phases 5-8). Alternately, differences between samples, such as between the lowest and highest level samples, can be utilized to determine whether a particular sampling phase is appropriate.

In general, a sampling phase is considered appropriate if it results in sampling the analog video signal in a stable, non-transitional, region. Phase 1 results in sampling the analog video signal 202 in a stable region for the lower value of the signal 202. Similarly, phases 5-8 result in sampling the analog video signal 202 in a stable region for the higher value of the signal 202. In contrast, phases 2-4 result in sampling the video signal 202 in an unstable or transitional region of the signal 202.

The phase detection circuit 20 and controller 18 select a preferred one of the phases based on the foregoing analysis. While any of the Phases 1, 5-8 would be suitable, an optimal phase may be selected that is between other suitable phases. This is so that if the phase drifts slightly or if ringing or noise occurs, the selected phase will still result in appropriate sampling of the analog RGB video signals. More particularly, phase 6 is between phase 5 and phase 7, while phase 7 is between phase 6 and phase 8, all of which result in sampling in a stable region of the video signal 202. Thus, phase 6 or phase 7 may be preferably selected for the clock signal. Once an appropriate phase is selected, controller 18 instructs the LLPLL 16 to adopt the selected phase.

HDTV Signals

Figure 3A:
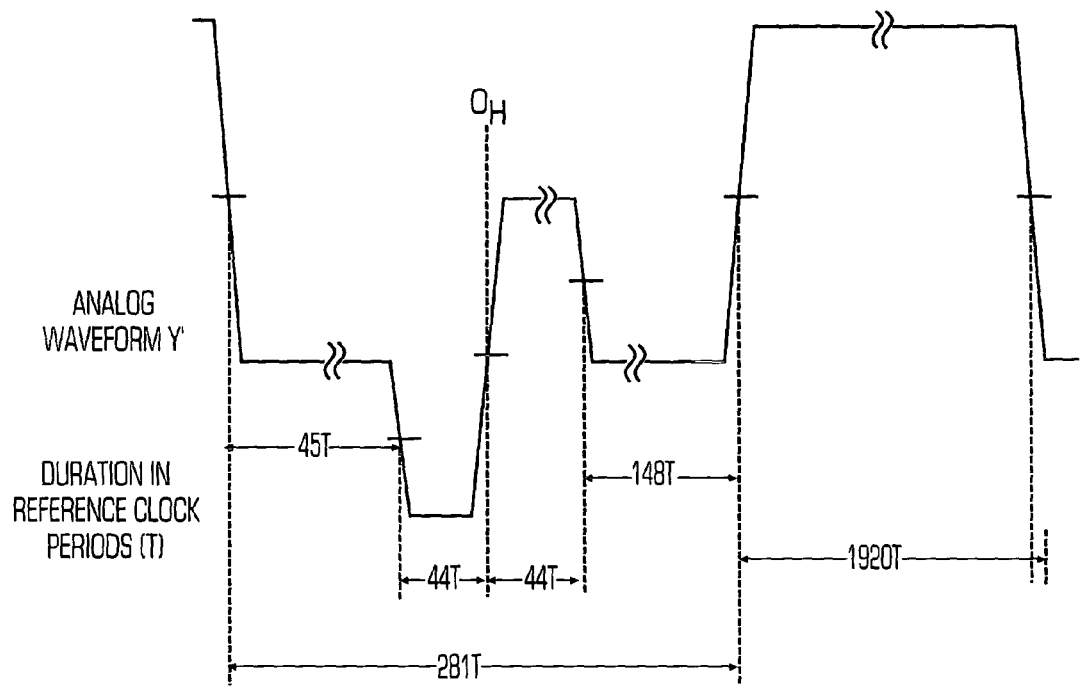
FIGS. 3A and 3B illustrate examples of standard tri-level sync pulses that define the start of each line of an HDTV signal.
Figure 3B:
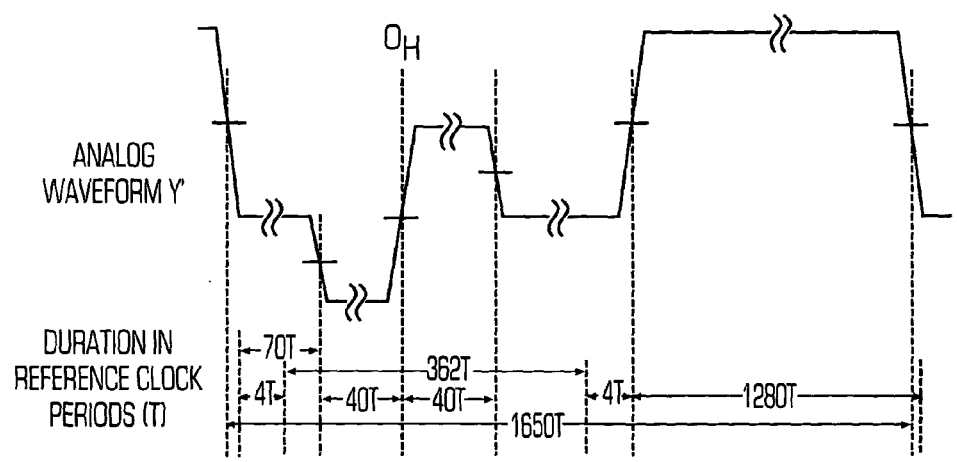

For HDTV signals, the phase detection circuit 20 utilizes the unique format of a standard YPbPr signal to perform phase detection. The standard for HDTV signals (i.e., SMPTE 274M) provides for a tri-level sync pattern or "sync pulse" at the beginning of each display line. Particularly, SMPTE 274M defines the position of the start of each line at the positive zero-crossing of a tri-level sync pulse. FIGS. 3A and 3B illustrate examples of tri-level sync pulses that define the start of each line of an HDTV interlaced signal (e.g., 1080i, shown in FIG. 3A) and a HDTV progressive signal (e.g., 720p, shown in FIG. 3B). These tri-level horizontal sync pulses are inserted on all analog HDTV outputs, pursuant to SMPTE 274M.

Because the sync pulse and the video data are based on the same clock source, a clock phase derived from the sync pulse can also be applied to the video pixel data. Phase detection circuit 20 applies this concept and utilizes these sync pulses to detect the target clock phase for clock signal CLK. Since the sync pulse does not change regardless of whether the video data is static or in motion, the phase detection circuit 20 can consistently use this portion of the HDTV signal to select a correct clock phase. Furthermore, the sync pulse region of the signal matches the requirement for phase detection for conventional spatial and temporal phase selection algorithms, i.e., static areas with transition. Thus, the phase detection circuit 20 may apply conventional methods to the sync pulse to determine the best phase for sampling the HDTV signal (e.g., the best phase providing the sharpest transition result from the A/D converter). In this manner, phase detection circuit 20 utilizes this specific characteristic of the HD signal to limit the phase detection window to the tri-level sync area for HD_YPbPr phase detection.

Figure 4A:
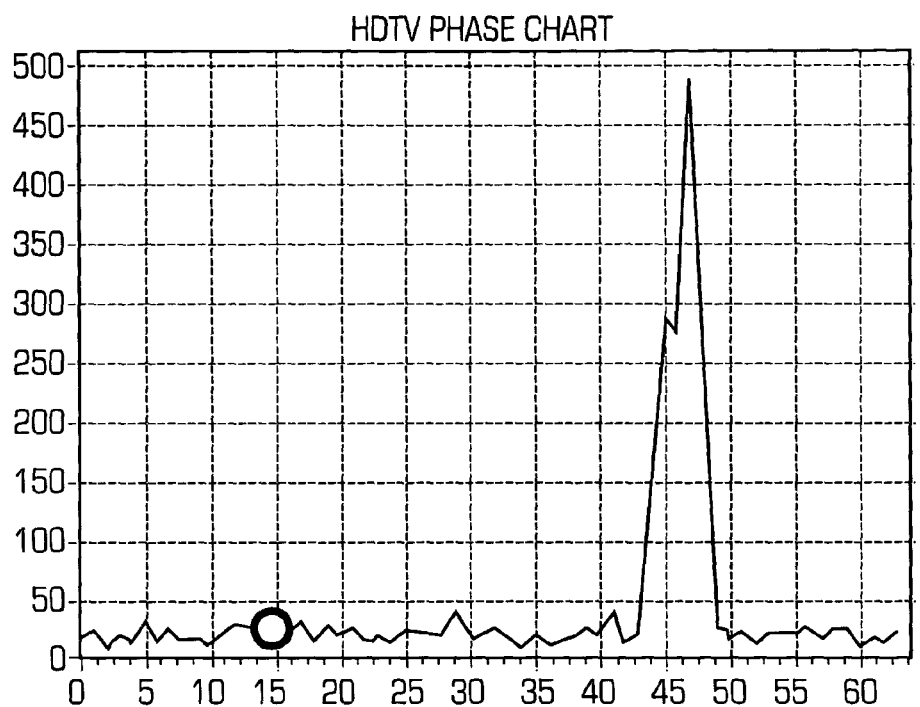
FIGS. 4A and 4B are exemplary plots of clock phase detection using the present invention.
Figure 4B:
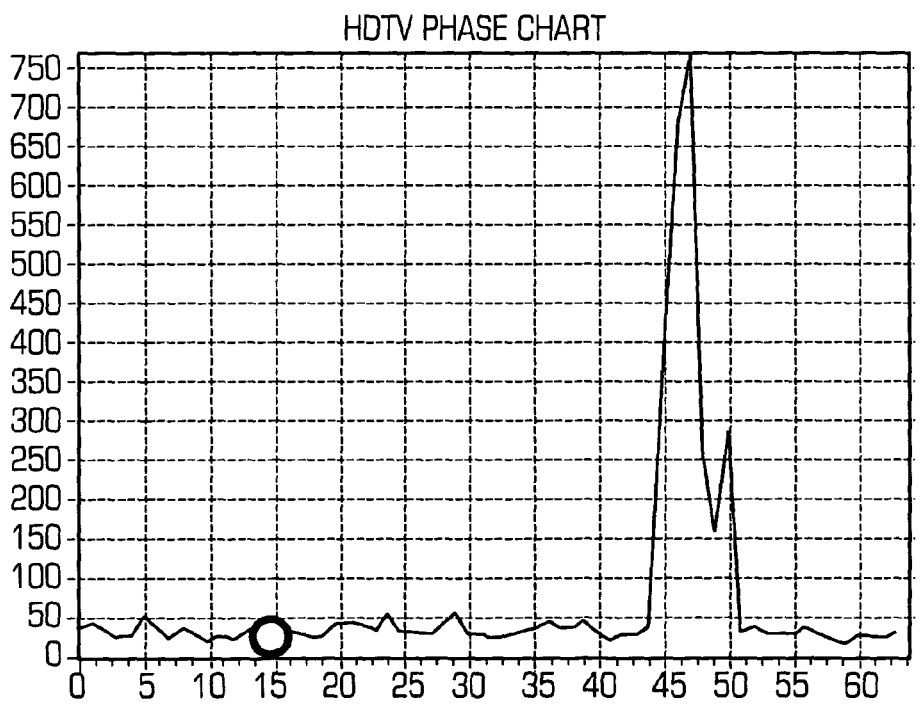

FIGS. 4 and 5 illustrate experimental results for detecting the phase for a sampling clock for an interlaced (1080i) HDTV signal, shown in FIG. 4, and a progressive (720p) HDTV signal, shown in FIG. 5. In each case, the target phase was selected from sixty-four different phases. As shown, the selected phases are in stable areas between transitions. (Although only a single transition is pictured in FIGS. 4, 5, one skilled in the art will appreciate that interpolating the graphs backward in time demonstrates the selected phases are almost exactly between peaks.)

From the foregoing, it should be apparent that the present invention provides an improved system and method for controlling the clock phase of a digital display device for use with HDTV signals, and a digital display device incorporating the system and method.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for detecting a phase of a clock signal for sampling an HDTV signal, comprising:
   detecting a sync pulse of the HDTV signal; and
   selecting a phase for the clock signal by applying a phase detection process to the sync pulse that results in sampling the sync pulse in a stable region.

2. The method of claim 1 further comprising:
   digitizing the HDTV signal.

3. The method of claim 1 wherein the sync pulse comprises a tri-level sync pulse.

4. The method of claim 1 wherein the HDTV signal is an interlaced signal.

5. The method of claim 4 wherein the HDTV signal is a 1080i signal.

6. The method of claim 1 wherein the HDTV signal is a progressive signal.

7. The method of claim 6 wherein the HDTV signal is a 720p signal.

8. The system of claim 1 wherein the HDTV signal is an interlaced signal.

9. The system of claim 8 wherein the HDTV signal is a 1080i signal.

10. A system for detecting a phase of a clock signal for sampling an HDTV signal, comprising:
    a circuit that detects a sync pulse of the HDTV signal, and selects a phase for the clock signal by applying a phase detection process to the sync pulse that results in sampling the sync pulse in a stable region.

11. The system of claim 10 wherein the circuit detects the sync pulse using a digitized HDTV signal.

12. The system of claim 11 further comprising:
a phase-locked loop that provides the clock signal; and
a controller that is coupled to the phase-locked loop and to the circuit, the controller being adapted to instruct the phase-locked loop to provide the clock signal at the selected phase based on information received from the circuit.

13. The system of claim 12 further comprising:
a sync separator that is coupled to the phase-locked loop, that separates sync data from the HDTV signal and that communicates the sync data to the phase-locked loop, which uses the sync data to provide the phase of the clock signal.

14. The system of claim 13 further comprising:
a mode detection circuit that is adapted to determine a frequency for the clock signal.

15. The system of claim 10 wherein the sync pulse comprises a tri-level sync pulse.

16. The system of claim 10 wherein the HDTV signal is a progressive signal.

17. The system of claim 16 wherein the HDTV signal is a 720p signal.

18. A display device comprising:
a display monitor for displaying images provided by an HDTV video source;
an A/D converter that is communicatively coupled to the display monitor, and that uses a clock signal to convert an analog input signal from the HDTV video source into a first digital signal that is used by the display monitor to display images;
a phase-locked loop that is communicatively coupled to the A/D converter and that provides the clock signal to the A/D converter;
a phase detection circuit that receives the first digital signal and that determines a target phase for the clock signal by detecting a sync pulse of the first digital signal, and selecting a phase for the clock signal by applying a phase detection process to the sync pulse that results in sampling the sync pulse in a stable region; and
a controller that is communicatively coupled to the phase detection circuit and to the phase-locked loop, the controller being adapted to instruct the phase-locked loop to provide the clock signal at the target phase based on information received from the circuit.

19. The display device of claim 18 further comprising:
processing circuitry that is communicatively coupled to the A/D converter and that is adapted to process the digital signal before communicating the digital signal to the display monitor.

20. The display device of claim 19 wherein the processing circuitry comprises a scaling circuit.

21. The display device of claim 20 further comprising:
driver circuitry that is communicatively coupled to the processing circuitry and to the display monitor, and that is adapted to drive the display monitor based on a processed digital signal received from the processing circuitry.

22. The display device of claim 21 wherein the signal from the HDTV video source comprises an interlaced signal, and wherein the processing circuitry further comprises a de-interlacing circuit.

23. The display device of claim 21 wherein the signal from the HDTV video source comprises a progressive signal.

24. The display device of claim 18 wherein the sync pulse comprises a tri-level sync pulse.

25. The display device of claim 21 further comprising:
a sync separator that is coupled to the phase-locked loop, that separates sync data from the signal from the HDTV video source and, that communicates the sync data to the phase-locked loop, which uses the sync data to provide the phase of the clock signal.

26. The display device of claim 18 further comprising:
a mode detection circuit that is adapted to determine a frequency for the clock signal.

\* \* \* \* \*